Dec. 8, 1964   B. C. MATHEWS   3,159,959
ANTISCALPING SUSPENSION FOR ROTARY HAY CUTTER
Filed May 28, 1963   3 Sheets-Sheet 3

Inventor:
Bernard C. Mathews
By: Zabel, Baker, York,
Jones & Duthmar
Attorneys

United States Patent Office 3,159,959
Patented Dec. 8, 1964

3,159,959
ANTISCALPING SUSPENSION FOR ROTARY HAY CUTTER
Bernard C. Mathews, Box 202, Crystal Lake, Ill.
Filed May 28, 1963, Ser. No. 283,873
10 Claims. (Cl. 56—24)

This invention relates to tractor drawn rotary hay cutters, such as mowers or choppers, which will not scalp the turf when ground surface irregularities are encountered.

A flail type rotor is often used in choppers for the reason that the flail will yield when a ground irregularity or a stone is encountered. However in the case of ground irregularities, the turf will oftentimes be scalped at that particular point. Where the ground irregularity is of larger dimensions, as in the case of a ridge, the scalping is quite objectionable because the grass roots will not fill in as readily where the scalped area is large.

Flail rotors may also be used for mowing and conditioning without chopping, as pointed out in my copending applications, Serial Nos. 86,471 (now Patent No. 3,092,-946, granted June 11, 1963) and 207,594, of which the present application is a continuation-in-part.

Tractor drawn hay cutters are commonly offset laterally from the tractor with the result that the draw bar is located at the side of the cutter frame, as shown in the above applications. This calls for an extremely rigid connection between the draw bar and the frame of the machine.

According to the present invention, I provide a connection between the draw bar and the frame which permits free up and down movement of the front of the machine so that the front of the machine can accommodate itself to ground surface irregularities while the weight of the machine is supported by the wheels. By means of a novel and ingenious arrangement of a pivot and springs, I suspend the machine in such a manner that the skids at the front edge of the machine will not dig into the ground.

This is particularly undesirable in a flail type of machine for the reason that the additional load imposed on the tractor, due to a sudden increase in friction between the skids and the ground surface, is accompanied by deceleration of the rotor with the result that the flails first swing forwardly, and then rebound with the result that there is a clashing of blades and utter disorganization of flail movement which interferes with the cutting action and may result in clogging of the machine.

Another object of my invention is to provide an antiscalping suspension which is independent of the means for adjusting the length of cut.

A further object is to provide an improved forage cutter which will accommodate itself to various types of ground irregularities without scalping, such as ridges which are oriented either in the transverse or in the longitudinal direction.

Other objects, features and advantages will become apparent as description proceeds.

In reference now to the drawings in which like reference numerals designate like parts:

FIG. 5 is a fragmentary sectional view on a reduced scale taken along line 5—5 of FIG. 2 and showing the parts in a changed position.

Figure 1:
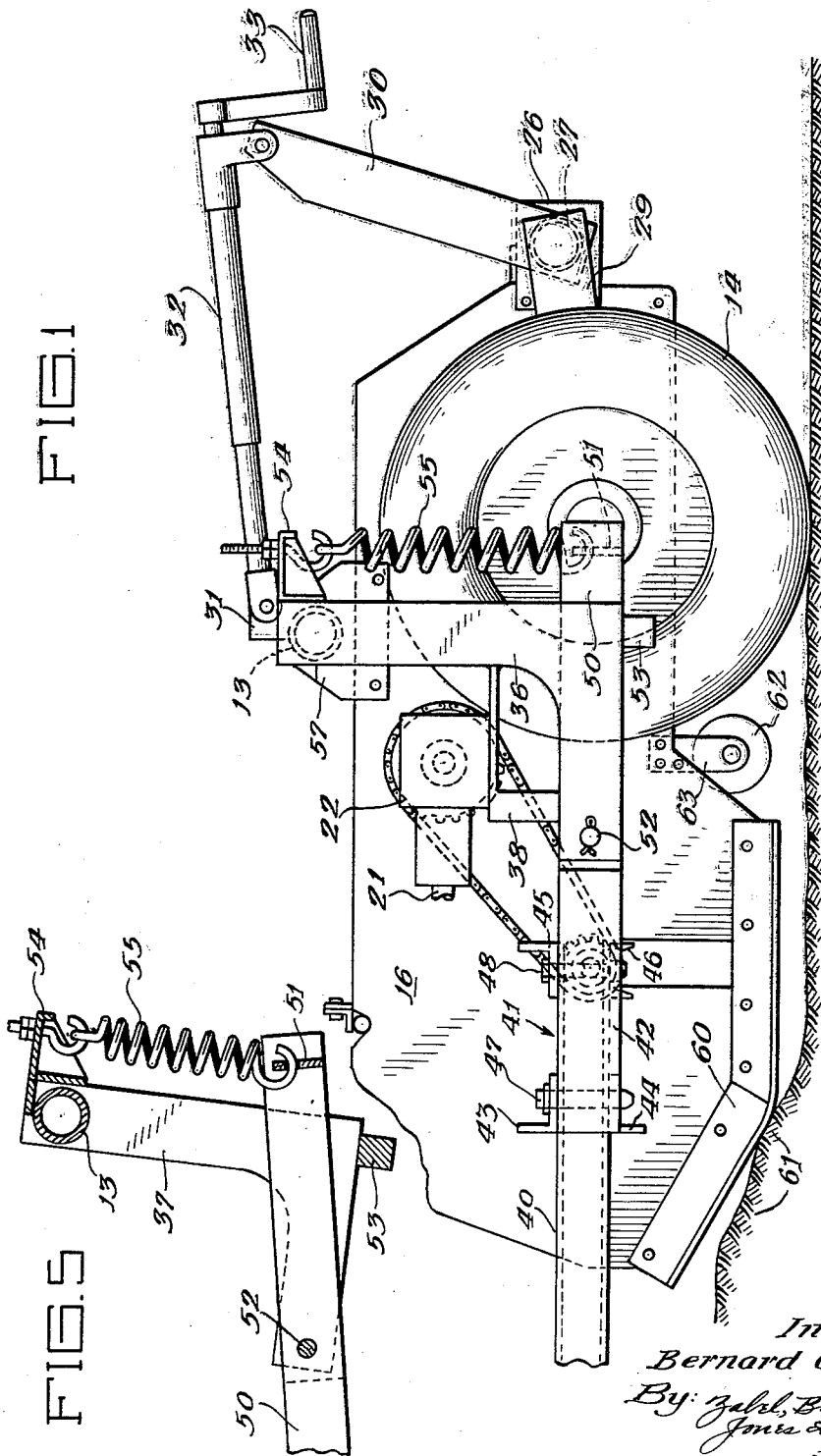
FIG. 1 is a side elevation of a preferred embodiment of my invention.

The cutter comprises a main frame 10, a subframe or outrigger 11, and a draw bar assembly 12. The main frame 10 and the subframe 11 are rigidly connected to each other by a tubular member 13 which permits the transmission of the pulling force from the subframe 11 to the main frame 10 even though the subframe is located at one side of the machine. The forage cutter is also provided with wheels 14 and 15 which support the same at the rear, the hitch plate of the tractor, not shown, being the third support for the assembly as a whole.

The main frame 10 comprises side plates 16 which are connected to each other by suitable means, such as a top plate 17 which includes a baffle portion 18, and a cross bar 19. The plate members 16 and 17 are structural members being made of heavy steel plate. The tubular member 13 is secured to one plate 16 by an ear 57 and to the other by a bracket 58, the connections being welded.

A flail type rotor 20 is suitably journaled in the side plates 16 and is driven from the tractor by a power take off shaft 21 through a gear box 22 located on the subframe 11. Blades 35 are pivotally mounted on the rotor 20. The details of the rotor construction and certain associated parts are not important from the viewpoint of the present invention; they are disclosed in the aforesaid copending application, Serial No. 207,594 with respect to a mowing machine, and in Serial No. 217,459, filed August 16, 1962 with respect to a chopper. In either type of machine the front wall 23 may be hingedly mounted to the top plate 17.

Figure 2:
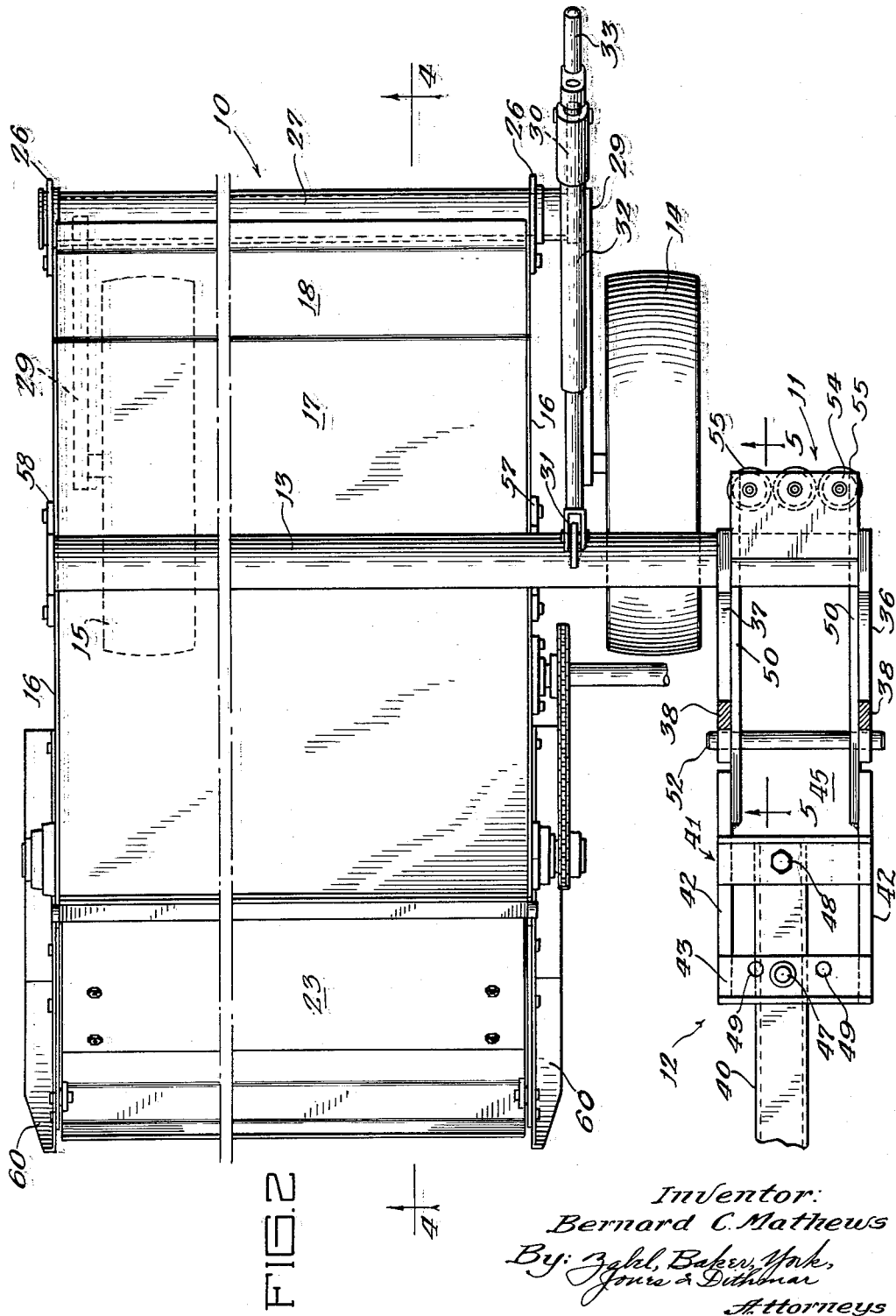
FIG. 2 is a plan view thereof.
Figure 3:
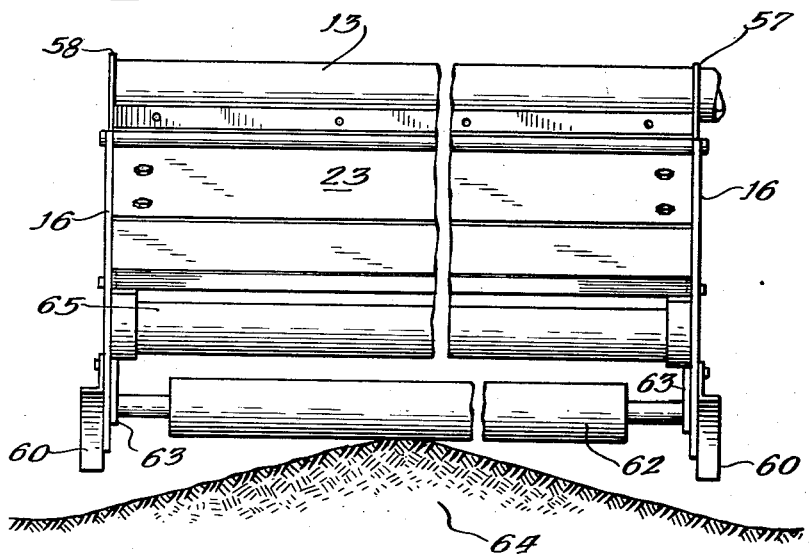
FIG. 3 is a front elevation illustrating the operation of the antiscalping roller.
Figure 4:
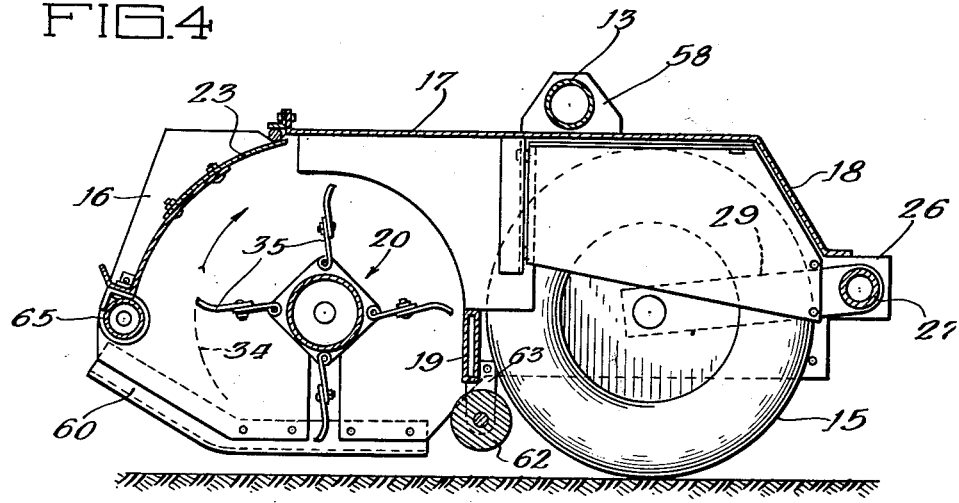
FIG. 4 is a vertical section taken along the line 4—4 of FIG. 2.

The wheels 14 and 15 form a part of a U-shaped wheel assembly by means of which the length of cut may be adjusted. As shown in FIGS. 2 and 4, there is an ear 26 mounted on and projecting rearwardly from the rear edge of each side plate 16, and a shaft 27 is journaled in the ears. Horizontal arms 28 and 29 are rigidly secured to the shaft 27, as by welding, and the wheels 14 and 15 are mounted at the front ends of the arms 28 and 29 respectively, as by means of suitable stub shafts, thus providing the U-shaped wheel assembly above mentioned.

A vertical arm 30 is also rigidly secured to the shaft 27, and a lug 31 is provided on the upper surface of the tubular member 13. A telescopic screw type adjusting device 32 connects the upper end of the vertical arm 30 with the lug 31, and is operated by a hand crank 33 so that the telescopic parts of the adjusting device 32 are drawn toward each other. Thus, the wheels 14 and 15 will be urged downwardly, elevating the rear end of the forage cutter with respect to the elevation of the front end of the draw bar assembly, in order to increase the clearance between the path 34 of the flail type rotor blades 35 and the ground. In other words, if it be assumed that there is a rigid connection between the main frame 10 and the draw bar assembly 12, operation of the hand crank 33 will regulate the angular disposition of the U-shaped wheel assembly with respect to the orientation of the draw bar assembly 12, thus regulating the length of the cut.

The subframe 11 comprises a pair of vertical plates 36 and 37 which may be L-shaped as shown in FIG. 1, or of other suitable configuration, and which are rigidly secured at their upper ends to the tubular member 13, thus providing a rigid connection between the main frame 10 and the subframe 11. A suitable bracket 38 can be provided for mounting the gear box 22 on the subframe 11.

The draw bar assembly 12 comprises a draw bar proper 40 and a socket arm 41 which are rigidly connected to each other. The socket arm 41 comprises a transversely spaced pair of front plates 42 which are connected to each other by a first set of upper and lower cross angles 43 and 44, and by a second set of cross members comprising an upper angle 45 and a lower channel 46, the vertical spacing between the upper and lower members of each set being substantially equal to the vertical dimension of the draw bar 40 so as to provide a socket for receiving the rear end of a draw bar 40 and which closely embraces the upper and lower surfaces thereof. The connection between the draw bar 40 and the socket arm 41 is effected by a front pin 47 passing through the cross members 43 and 44 and a rear pin 48 passing through the cross members 45 and 46. The front set 43 and 44 is provided with a series of holes 49 for receiving the front pin 47 so that the angular adjustment of the draw bar 40 with respect to the orientation of the machine as a whole may be shifted depending on the extent of offset desired between the forage cutter and the tractor. Thus a rigid connection is provided between elements 40 and 41 even though the arrangement permits an angular shift of the parts.

The socket arm also includes a transversely spaced pair of rear plates 50 which are welded to the inner surfaces of the front plates 42 and are connected at their rear end by a cross bar 51. The rear plates 50 fit between the vertical plates 36 and 37 as shown in FIG. 2 and are pivotally connected to the same by a pivot pin 52. A stop bar 53 is welded to the lower edge of the vertical plates 36 and 37 at a point rearwardly of the pivot pin 52, to limit in one direction the relative movement between the draw bar assembly 12 and the subframe 11. The arrangement is such that the stop bar 53 prevents downward movement of the front end of the main frame 10, although it permits upward movement thereof as shown in FIG. 5. The normal operating position of the parts in which the lower edges of the rear plates 50 rest against the stop bar 53 is shown in FIG. 1 and this maintains the blade path 34 clear of level ground by a predetermined distance depending upon the setting of the U-shaped wheel assembly as determined by the hand crank 33.

The rear end of the rear plate 50 and the cross bar 51 comprise a tail portion of the draw bar assembly 12 which is extended rearwardly beyond the pivot pin 52 and stop bar 53. The subframe 11 includes a cross bracket 54 located at the top of the vertical plates 36 and 37. One or more heavy tension springs 55 extend between the cross bar 51 and the cross bracket 54 which urge the main frame 10 and subframe 11 in the clockwise direction as seen in FIG. 1, with respect to the draw bar assembly 12. In other words, the springs urge the parts in the direction in which freedom of movement is permitted, this being the direction in which the front part of the forage cutter will be elevated. Adjustably mounted hooks 56 permit the tension of the springs 55 to be adjusted, the arrangement being such that the springs serve as a counterbalancing means for the weight of the front part of the machine, as exemplified by the main frame 10.

The side plates 16 are provided at their lower front edges with skids 60 which are adapted to engage ground surface irregularities such as the irregularities 61 shown in FIG. 1. By virtue of the pivoted connection above described, the front portion of the machine will tend to be elevated to permit the machine to ride over the irregularities 61, and the wheels 14 and 15 are at the same time in contact with the ground. Thus, the rotor 20 will be elevated correspondingly so that it will not scalp the turf at the irregularities 61.

Ordinarily, it would be expected that the friction between the skids 60 and the ground at point 61 would be sufficient to greatly increase the load upon the tractor, and the weight of the machine would cause the skids to dig into the ground at point 61 to an extent which would damage the turf. However, due to the suspension provided by the springs 55, the force exerted by the skids 60 on the ground at point 61 is greatly diminished, with the result that the front part of the machine will ride smoothly over the irregularities 61 without damage to the turf and without imposing any substantially greater load on the tractor.

The actual movement of the front end of the machine is a rotational movement with respect to the wheels, but nevertheless, by virtue of the present construction in which the pivot pin 52 is located forwardly of the wheels by a considerable distance, it is possible to obtain a much more compact arrangement than one which would be provided by counterbalancing springs located rearwardly of the wheel axis.

In order to provide an antiscalping action with respect to longitudinally disposed ridges, or to accommodate situations in which one or both of the wheels 14 or 15 drop into a rut, I provide a roller 62 which extends transversely of the machine and is mounted on suitable brackets 63 which depend from the side plates 16 or from the cross bar 19, or both. As shown in FIG. 2, when a longitudinal ridge or ground irregularity 64 is encountered which is narrower than the distance between the skids 60, then the ridge 64 will be engaged by the roller 62 to maintain a clearance between the irregularity 64 and the blade path 34 which is sufficient to avoid scalping. As shown in FIGS. 1 and 4, the elevation of the roller 62 is such that it will normally clear the ground by a subsantial distance which is at least equal to the normal clearance between the skids 60 and the level ground.

In a forage cutter it is not practical to locate an antiscalping roller forwardly of the rotor 20. However, when the present arrangement is applied to a mower having an adjustable plant deflector 65, in certain low settings of the plant deflector (which in some instances may be as low as five inches above normal ground level as pointed out in my aforesaid copending application, Serial No. 207,594), the spring suspension provided in accordance with the present invention will reduce the force exerted by the ground irregularity 64 on the plant deflector roller 65 sufficiently as to avoid damage to the plant deflector, the mounting of which is less rugged than that of the antiscalping roller 62.

The operation of my invention has been pointed out in detail with the description of the various parts and subassemblies. To summarize the same, it will be seen that any desired blade clearance can be provided by means of the hand crank 33, and that the resulting position of the wheels 14 and 15 with respect to the main frame 10 has no effect on the operation of the antiscalping suspension.

On the other hand, when the skids 60 encounter a surface irregularity, the spring suspension permits the front of the machine to be elevated to prevent scalping and at the same time the forces encountered are greatly reduced over what they would ordinarily be. The springs 55 are preferably adjusted so that the front of the machine can be lifted an inch or so by a single man when the lifting force is applied to the very front of the machine, such as the plant deflector 65, and this is in spite of the fact that a machine cutting a swath of six feet weighs approximately 2000 pounds.

The arrangement of the wheels 14 and 15 is such that the wheel 15 is disposed between the side plates 16 so that it will ride in the swath which is being cut, whereas the wheel 14 is disposed exteriorly of its associated side plate 16 so that it rides in the swath which was cut in the previous pass of the machine around the field.

The disclosures of my aforesaid copending applications, Serial Nos. 207,594 and 217,459 are incorporated herein by reference, insofar as consistent with the present disclosure.

Although only a preferred embodiment of my invention has been shown and described herein, it will be apparent that various modifications and changes may be made in the construction shown without departing from the spirit of my invention as pointed out by the appended claims.

I claim:
1. A rotary hay cutter comprising a main frame, a rotor including cutter blades mounted in the front part of said main frame, a subframe rigidly connected to said main frame at one side thereof, a draw bar assembly, a horizontal pivot connecting said draw bar assembly to said subframe, a pair of wheels located at the rear of said main frame and providing partial support for said main frame, stop means providing engagement between said draw bar assembly and said subframe to limit downward movement of the front of said hay cutter with respect to said wheels, adjustable mounting means for mounting said wheels with respect to said main frame so that the elevation of said rotor above the ground can be regulated, spring means extending between said draw bar assembly and said subframe for facilitating upward movement of the front of said cutter with respect to said draw bar assembly about said pivot, and skids secured to said main frame at either side of said rotor and forwardly thereof to cause upward tilting of the front part of said main frame about said pivot and with respect to said draw bar when ground irregularities are engaged by said skids.

2. In a rotary hay cutter having a mobile main frame, a cutting rotor rotatably journaled in said main frame, a draw bar assembled arranged at one side of said main frame, and skids mounted on said main frame at either side of said rotor for maintaining a minimum clearance between said rotor and the ground, an antiscalping suspension for said main frame which comprises a subframe rigidly connected to said main frame at one side thereof, horizontal pivot means connecting said draw bar assembly to said subframe, stop means interposed between said draw bar assembly and said subframe to limit pivotal movement of said main frame with respect to said draw bar assembly in order to maintain a normal operating clearance between said skids and the ground, and spring means extending between said draw bar assembly and said subframe for urging said draw bar assembly in a direction away from said stop means.

3. A rotary hay cutter comprising a main frame, a subframe rigidly connected to said main frame at one side thereof, a draw bar assembly, a horizontal pivot located intermediate the ends of said draw bar assembly and connecting said draw bar assembly to said subframe, wheels providing partial support for said main frame and located at a point rearwardly of said pivot, stop means interacting between said draw bar assembly and said subframe to limit downward movement of the front of said hay cutter with respect to said wheels, adjustable mounting means for mounting said wheels with respect to said main frame so that the length of cut can be regulated, and spring means disposed rearwardly of said pivot and extending between a rearwardly extended portion of said draw bar assembly and the upper part of said subframe for facilitating upward movement of the front of said cutter with respect to said draw bar assembly about said pivot, a rotor including cutter blades mounted in the front part of said main frame, and skids secured to said main frame at either side of said rotor and slightly forwardly thereof to cause upward tilting of the front part of said main frame about said pivot and with respect to said draw bar when ground irregularities are engaged by said skids.

4. A rotary hay cutter as claimed in claim 3 which includes a transversely oriented roller located rearwardly of said rotor and having its lower periphery located above the level of said skids.

5. A rotary hay cutter as claimed in claim 3 in which said draw bar assembly comprises a draw bar and a socket arm, said socket arm comprising a transversely spaced pair of vertical plates and upper and lower cross members defining a socket for the reception of one end of said draw bar, a front vertical pin and a rear vertical pin passing through said cross members and said draw bar for rigidly securing said draw bar to said socket arm, said cross members including a series of holes for receiving one of said pins so that the angular disposition of said draw bar with respect to said socket arm may be adjusted.

6. A rotary hay cutter as claimed in claim 3 in which said adjustable wheel mounting means comprises a U-shaped wheel assembly including a shaft and a pair of horizontal arms, means for journaling said shaft in said main frame, said wheels being mounted on the free ends of said horizontal arms, and means for adjusting the angular orientation of said U-shaped wheel assembly with respect to said main frame.

7. A rotary hay cutter as claimed in claim 3 in which said cutter blades are pivotally mounted on said rotor.

8. A rotary hay cutter as claimed in claim 3 which includes a transversely oriented plant deflecting roller located forwardly of said rotor and having its lower periphery located above the level of said skids.

9. A rotary hay cutter as claimed in claim 3 in which said main frame includes a pair of longitudinally disposed vertical plates and a transverse tubular cross member connecting said plates and extending beyond one of said plates, said subframe being connected to said tubular cross member.

10. A rotary hay cutter comprising a frame a rotor including cutting blades rotatably mounted in said frame, a pair of wheels mounted at the rear of said frame, draw bar means extending forwardly of said frame for connection to a tractor, said frame comprising a pair of longitudinally disposed vertical plates, a plurality of transverse spacer members connecting said plates to each other, and including a tubular cross member disposed above said plates and extending laterally beyond one of said plates, a subframe rigidly supported by said extended tubular member and including horizontal pivot means, said draw bar means including a draw bar and a socket arm, and means for securing said draw bar to said socket arm rigidly with respect to vertical movement, said socket arm being pivotally mounted in said subframe and including a tail portion which extends rearwardly of said pivot means, a tension spring extending between the upper portion of said subframe and the tail of said socket arm for partially counterbalancing said main frame and rotor with respect to said pivot means, said plates having skid portions attached thereto for maintaining a minimum clearance between the path of said rotor blades and the ground, a transverse roller disposed rearwardly of said rotor and having its lower surface disposed below the lowermost point of said blade path for determining blade clearance with respect to longitudinal ground irregularities, said skid portions maintaining clearance with respect to transverse ground irregularities and the counterbalancing effect exerted by said tension spring facilitating the pivotal movement of said frame with respect to said draw bar means as said skids are engaged by said transverse ground irregularities, stop means interacting between said draw bar means and said subframe to limit rotation of said frame in the forwardly and downwardly direction, and means for adjusting the position of said wheels with respect to said frame to regulate the normal operating clearance between the path of said rotor blades and the ground as determined by the elevation of the front end of said draw bar and said stop means.

References Cited in the file of this patent

UNITED STATES PATENTS 2,710,514    Broussard _____ June 14, 1955

FOREIGN PATENTS 1,208,357    France _____ Sept. 14, 1959
888,676      Great Britain _____ Jan. 31, 1962

UNITED STATES PATENT OFFICE
CERTIFICATE OF CORRECTION

Patent No. 3,159,959            December 8, 1964

Bernard C. Mathews

It is hereby certified that error appears in the above numbered patent requiring correction and that the said Letters Patent should read as corrected below.

Column 5, line 25, for "assembled" read -- assembly --; column 6, line 25, after "frame" insert a comma.

Signed and sealed this 20th day of April 1965.

(SEAL)
Attest:

ERNEST W. SWIDER            EDWARD J. BRENNER
Attesting Officer            Commissioner of Patents